US007199988B2

(12) United States Patent
Komori et al.

(10) Patent No.: US 7,199,988 B2
(45) Date of Patent: Apr. 3, 2007

(54) DISCHARGE TUBE LIGHTING TRANSFORMER WITH PROTECTIVE CIRCUIT AGAINST NON-GROUNDING OF GROUND TERMINAL

(75) Inventors: Hitoshi Komori, Motosu (JP); Hideki Shimizu, Motosu (JP); Kazuhifo Kobayashi, Motosu (JP); Yoshihiro Matsui, Motosu (JP)

(73) Assignee: Lecip Corporation, Gifu (JP)

( * ) Notice: Subject to any disclaimer, the term of this patent is extended or adjusted under 35 U.S.C. 154(b) by 214 days.

(21) Appl. No.: 10/871,035

(22) Filed: Jun. 21, 2004

(65) Prior Publication Data

US 2005/0002213 A1 Jan. 6, 2005

(30) Foreign Application Priority Data

Jun. 27, 2003 (JP) ............................ 2003-185291

(51) Int. Cl.
*H02H 3/00* (2006.01)
*H02H 7/122* (2006.01)
*H01F 17/00* (2006.01)

(52) U.S. Cl. ...................................... 361/42; 363/56.01

(58) Field of Classification Search .................. 363/50, 363/55, 56.01, 56.09; 323/355–359; 361/42, 361/45, 49, 88, 91.1
See application file for complete search history.

(56) References Cited

U.S. PATENT DOCUMENTS 4,150,411 A * 4/1979 Howell ........................ 361/45
5,241,443 A * 8/1993 Efantis ........................ 361/36
5,847,909 A * 12/1998 Hopkins et al. .............. 361/35
6,104,585 A * 8/2000 Matsui et al. ................. 361/38
6,111,732 A * 8/2000 Beland ........................ 361/42
6,504,691 B1 1/2003 Matsui et al.
6,621,670 B2 * 9/2003 Hayakawa et al. ........... 361/42
6,680,583 B2 * 1/2004 Noda et al. ................. 315/224

* cited by examiner

*Primary Examiner*—Matthew V. Nguyen
(74) *Attorney, Agent, or Firm*—Connolly Bove Lodge & Hutz LLP

(57) ABSTRACT

An arrangement is made in a transformer such that voltages induced on the opposite sides of a mid-point 17 of a secondary winding 16 are unbalanced by an amount on the order of 5%. When a ground terminal 18 is not grounded while a mid-point of a load is grounded, a voltage $V_{UE}$ is developed between the mid-point 17 and a non-active line terminal 15 and is rectified to provide a rectified output which turns a transistor 28 on, causing a light emitting element 33L to emit light. The resulting light renders a light receiving element 33P conductive, whereby a relay 37 is operated to turn a switch 13 off. When a ground fault occurs on one side of the secondary winding 16 while the ground terminal 16 is not grounded, a ground fault detection circuit 38 fails to detect the ground fault, but the non-grounding protection circuit 30 detects the ground fault and turns the switch 13 off.

7 Claims, 3 Drawing Sheets

DISCHARGE TUBE LIGHTING TRANSFORMER WITH PROTECTIVE CIRCUIT AGAINST NON-GROUNDING OF GROUND TERMINAL

BACKGROUND OF THE INVENTION

The present invention relates to a transformer for lighting a discharge tube such as a neon tube or an argon tube, in particular, to a discharge tube lighting transformer with a protective circuit against non-grounding of a ground terminal thereof when the transformer is installed.

FIG. 1 shows a conventional transformer of the kind described above, which is disclosed in FIG. 11 of U.S. Pat. No. 6,504,691 (issued Jan. 7, 2003). A leakage transformer 11 includes a primary winding 12, one end of which is connected through a switch 13 to a hot line terminal 14 and the other end of which is connected to a non-active line terminal 15. An a.c. power source such as a commercial power supply is connected between the hot line terminal 14 and the non-active line terminal 15, and the ground terminal of the a.c. power source 10 is connected to the non-active line terminal 15. The leakage transformer (hereafter simply referred to as a transformer) 11 also includes a secondary winding 16 having a mid-point 17 which is connected to a ground terminal 18. A sign lamp (discharge tube) such as a neon tube, an argon tube or the like is connected between the opposite ends 16A and 16B of the secondary winding 16. Where the transformer 11 has a metal casing 11*a*, the ground terminal 18 is provided on the casing 11*a*. When the transformer 11 is installed on a neon tower or the like, the ground terminal 18 is grounded through a lead wire 18*a*.

When there is a voltage in excess of a given value between the non-active line terminal 15 and the ground terminal 18, it is detected by a non-grounding detection circuit 21. Specifically, one end of a capacitor 22 is connected to the ground terminal 18 while its other end is connected to the cathode of a diode 23 and to the anode of a diode 24. The cathode of the diode 24 is connected to one end of a capacitor 26 through a resistor element 25 while the anode of the diode 23 and the other end of the capacitor 26 are connected to the non-active line terminal 15, and a junction between the diode 24 and the resistor element 25 is connected to the non-active line terminal 15 through a Zener diode 27. A junction between the resistor element 25 and the capacitor 26 is connected to the base of a transistor 28 acting as a switching element, and the emitter of the transistor 28 is connected to the non-active line terminal 15 through a Zenor diode 29. It is to be understood that the resistor element 25 and the capacitor 26 can be omitted.

An input portion of the non-grounding detection circuit 21 is a rectifier circuit including the capacitor 22 as an input. In this example, a rectifier circuit 31 is formed by the capacitors 22 and 26 and the diodes 23 and 24. When a rectified output voltage of the rectifier circuit 31 exceeds a given value, the transistor 28 is rendered conductive.

When the non-grounding detection circuit 21 detects a voltage which is equal to or greater than a given value, interrupter means interrupts the supply of the a.c. power to the primary winding 12. At this end, the collector of the transistor 28 is connected to the hotline terminal 14 through a light emitting element 33L of a photocoupler 33 and through a path including resistor elements 34 and 35 and a rectifying diode 36. A series circuit including a light receiving element 33P of the photocoupler 33 and a relay 37 is connected between the hot line terminal 14 and the non-active line terminal 15, and the switch 13 is formed by a changeover switch which is formed by contacts of the relay 37. When the relay 37 is operated, a movable contact MC of the switch 13 is thrown to a normally open contact NO, whereby the hot line terminal 14 is connected to the relay 37 through the normally open contact NO of the switch 13, thus forming a self-holding circuit of the relay 37.

The leakage transformer 11 is constructed so that voltages induced across the windings 16*a* and 16*b* disposed on the opposite sides of the mid-point 17 of the secondary winding 16 are unbalanced with respect to the mid-point 17. For example, the transformer may be constructed such that two magnetic circuits which pass magnetic fluxes resulting from a flow of a current through the both secondary windings 16*a* and 16*b* have responses which are different from each other. As shown in FIG. 2, the primary winding 12 is disposed centrally on one side of a magnetic core 71 which is in the form of a rectangular frame while the secondary windings 16*a* and 16*b* are disposed on the magnetic core 71 at locations which are disposed on the opposite sides of the primary winding 12, with leakage cores 72 and 73 being provided at locations between the primary winding 12 on one hand and secondary windings 16*a* and 16*b*, respectively, on the other hand for shunting the magnetic path of the magnetic core 71. In the example shown, the leakage cores 72 and 73 have widths t1 and t2, respectively, which are different from each other to provide different magnetic flux leakage responses, thus making magnetic circuits 74 and 75 which pass magnetic fluxes resulting from a flow of a current through the secondary windings 16*a* and 16*b* to be mutually unbalanced. t1 may be by 10 to 30% less than the width t of the magnetic core 71 while t2 may be by 10 to 30% greater than t.

A secondary wiring may be passed through a flexible metal tube commonly referred to as a metal conduit in order to prevent a fire casuality. In this instance, a metal conduit assumes a ground potential, and accordingly, there is a current flow though slightly through a capacitance of the conduit. This is illustrated in FIG. 3 where it will be noted that the output terminals 16A and 16B are grounded through capacitances $C_{S1}$ and $C_{S2}$, respectively, and accordingly, a very week current flows to the ground through these capacitances $C_{S1}$ and $C_{S2}$. It then follows that the output terminals 16A and 16B are connected to the ground (reference potential) through high impedance elements which are based on the capacitances $C_{S1}$ and $C_{S2}$.

In this arrangement, if the ground terminal 18 is actually grounded, a potential difference between the non-active line terminal 15 and the ground terminal 18 is equal to zero, and accordingly, no voltage is applied to the non-grounding detection circuit 21. Accordingly, the transistor 28 remains non-conductive, and the relay 37 cannot be operated and the movable contact MC of the switch 13 is thrown to the normally closed contact NC, and thus the a.c. power from the terminals 14 and 15 are supplied to the primary winding 12.

However, if the a.c. power is applied across the terminals 14 and 15 when the ground terminal 18 is not grounded, the ground potential which the metal conduit assumes becomes a reference, and potentials at the output terminals 16A and 16B are less than a maximum potential $V_{max}$ by voltage drops V1 and V2, respectively, across the capacitances $C_{S1}$ and $C_{S2}$, and a potential V3 which is equivalent to such reduction occurs at the mid-point 17. An ordinate 92 in FIG. 3 represents a position from the mid-point 17 to the terminal 16A and 16B, and an abscissa 93 represents a potential as referenced to the ground potential, and a curve 91 depicts a potential on the secondary winding 16. The ordinate and the abscissa cross at point 94, which corresponds to the mid-point 17, and which assumes a potential of zero. However, due to differences in the magnetic responses of the magnetic circuits 74 and 75, a voltage is developed at the mid-point 17 of the secondary winding 16 even though the magnitude of the voltage is small. As a consequence, when the ground terminal 18 is not grounded, a voltage is developed between the ground terminal 18 and the non-active line terminal 15, and is rectified by the rectifier circuit 31. When the rectified output voltages becomes greater than a sum of the Zener voltage of the Zener diode 29 which may be assumed to be 12V and the base-emitter voltage of the transistor 28, which may be assumed to be 0.6V, for example, the rectified output from the rectifier circuit 31 renders the transistor 28 conductive, whereby there occurs a current flow through the light emitting element 33L to emit light, which causes the light receiving element 33P to operate the relay 37, throwing the movable contact MC of the switch 13 to the normally open contact NO, thus interrupting the supply of the source power to the primary winding 12 and maintaining such condition by the self-holding circuit of the relay 37. Accordingly, if one intends to operate the discharge tube lighting system when he has forgotten grounding the ground terminal 18, the supply of the source power is automatically interrupted, and the lighting system cannot be operated.

Rather than using different widths for the leakage cores 72 and 73, different lengths G1 and G2 may be used for magnetic air gaps in order to produce different flux leakage responses of the leakage cores 72 and 73. Alternatively, both the widths t1 and t2 and the lengths G1 and G2 may be different from each other. Alternatively, the secondary windings 16*a* and 16*b* may have slightly different lengths, thus shifting the mid-point 17 slightly. What is required is that the magnetic circuits 74 and 75 have different magnetic responses. However, when an unbalance between the magnetic circuits 74 and 75 is too high, it may have an adverse influence upon the lighting response of the sign lamps. In sum, it is essential that the magnetic responses of the magnetic circuits 74 and 75 which are formed by the secondary windings 16*a* and 16*b*, respectively, be by an amount on the order of ±10 to 30% greater or smaller than those of the conventional magnetic circuits 74 and 75 which have an equal magnetic response.

When a conventional non-grounding protective circuit is used, in the event an operating personnel has forgotten to ground the ground terminal 18, no a.c. power is supplied to the primary winding of the transformer, thus assuring the safety. However, when installing the discharge tube lighting transformer, if an operating personnel inadvertently connects the hot line terminal 14 to the ground side of the a.c. power source 10 and connects the non-active line terminal 15 to the non-grounded side of the a.c. power source 10 or when the connection is made in a wrong polarity, the non-grounding protective circuit becomes operative, ceasing to supply the a.c. power to the primary winding 12. Specifically, when the connection is made in the wrong polarity, if the ground terminal 18 is grounded, the non-active line terminal 15 has a potential which changes in a sinusoidal form to the positive and the negative polarity with respect to the ground potential of the a.c. power source 10. Accordingly, when the non-active line terminal 15 assumes a negative potential with respect to the ground terminal 18 which is grounded, the a.c. power which then prevails is rectified by the rectifier circuit 31 to provide a rectified output, which renders the transistor 28 conductive, causing the light emitting element 33L to emit light and thus operating the relay 37, whereby the a.c. power can no longer be supplied to the primary winding 12.

A mistake may occur in the wiring due to a troublesome wiring work, and the polarity of the a.c. power source 10 may be unclear sometimes, and therefore there has been a need that an operating personnel examine the polarity of the a.c. power source 10 in order to avoid a wiring in the wrong or inverse polarity. An operating personnel is demanded each time the wiring work is made to see if the connection has been made in the right polarity, but it is possible that the operating personnel forgets the need of such inspection, and there may be no output from the secondary winding 16 as a result of the connection in the inverse polarity, but an inadvertent decision may be rendered that this has occurred as a result of a failure of the transformer 11 itself. In addition, an inspection which takes place in a factory is made by connecting discharge tubes 19 in series across the output terminals 16A and 16B without using a metal conduit and without grounding the mid-point of a series connection or the mid-point of the load. Again, if the ground terminal 18 is not grounded, a reference potential point on the secondary side cannot be fixed, for example, allowing the voltage occurring at the mid-point 17 to vary in an unstable manner. Where a secondary a.c. output voltage is equal to 15 kV, it is possible that the voltage at the mid-point 17 may be on the order of 100V, causing the non-grounding detection circuit 21 to operate. Accordingly, it must be assured during the inspection that ground terminal 18 be grounded. Also during the inspection, if the connection between the a.c. power source 10 and the hotline terminal 14 and the non-active line terminal 15 is made in a wrong polarity, the non-grounding detection circuit 21 may operate. Accordingly, it must be assured that the ground terminal 18 is grounded and that the connection with the a.c. power source 10 is made in a right porality also during the inspection, requiring an increased length of time for such inspection. In addition, there is a likelihood that the operating personnel may forget to assure this, to foul the inspection.

In the prior art practice, the non-grounding detection circuit 21 is provided for the reason to be described below. When a discharge tube lighting transformer is installed on a neon tower, for example, if a wiring for the discharge tubes 19 happens to be in contact with the neon tower while the discharge tubes on the neon tower are illuminated, a high tension a.c. power may flow to the neon tower, which represents the ground, presenting a risk of causing a fire. In order to detect such a so-called ground fault, the mid-point 17 of the secondary winding has been connected to the ground terminal 18 through a ground fault detection circuit 38, as indicated in broken lines in FIG. 1. A specific example of the ground fault detection circuit 38 will be described later with reference to FIG. 4. A corresponding circuit is shown in FIG. 9 of the U.S. Pat. No. 6,504,691 as designated by reference numeral 41.

This ground fault detection circuit 38 cannot detect a ground fault if the ground terminal 18 is not grounded. The purpose of the non-grounding detection circuit 21 is to prevent this from occurring. However, the conventional non-grounding detection circuit has difficulties which were described above.

It is an object of the present invention to provide a discharge tube lighting transformer with a no-grounding protective circuit which does not operate for a wiring in the inverse polarity, but which operates upon occurrence of a ground fault if the ground terminal is not grounded.

SUMMARY OF THE INVENTION

In accordance with the present invention, an arrangement is made such that voltages which are induced across windings disposed on the opposite side of a mid-point of a secondary winding of a transformer are unbalanced. A non-grounding protection circuit is connected between the mid-point of the secondary winding and a non-active line terminal to detect a voltage applied between the mid-point of the secondary winding and the non-active line terminal which is greater than an a.c. voltage applied between the hot line terminal and the non-active line terminal, providing a detection output which is effective to interrupt the supply of the a.c. power to the primary winding.

With this arrangement, the occurrence of a ground fault is detected if the ground terminal is not grounded, but if the connection between the transformer and the a.c. power source is made in the reveres polarity, there is no likelihood that such connection be detected as a non-grounded condition. Accordingly, an operating personnel who installs the discharge tube lighting transformer can perform a connection with the a.c. power source in a simple manner. Nevertheless, upon occurrence of a ground fault, the non-grounding protection circuit operates to interrupt the supply of the power to the secondary side.

MODE OF CARRYING OUT THE INVENTION

Figure 1:
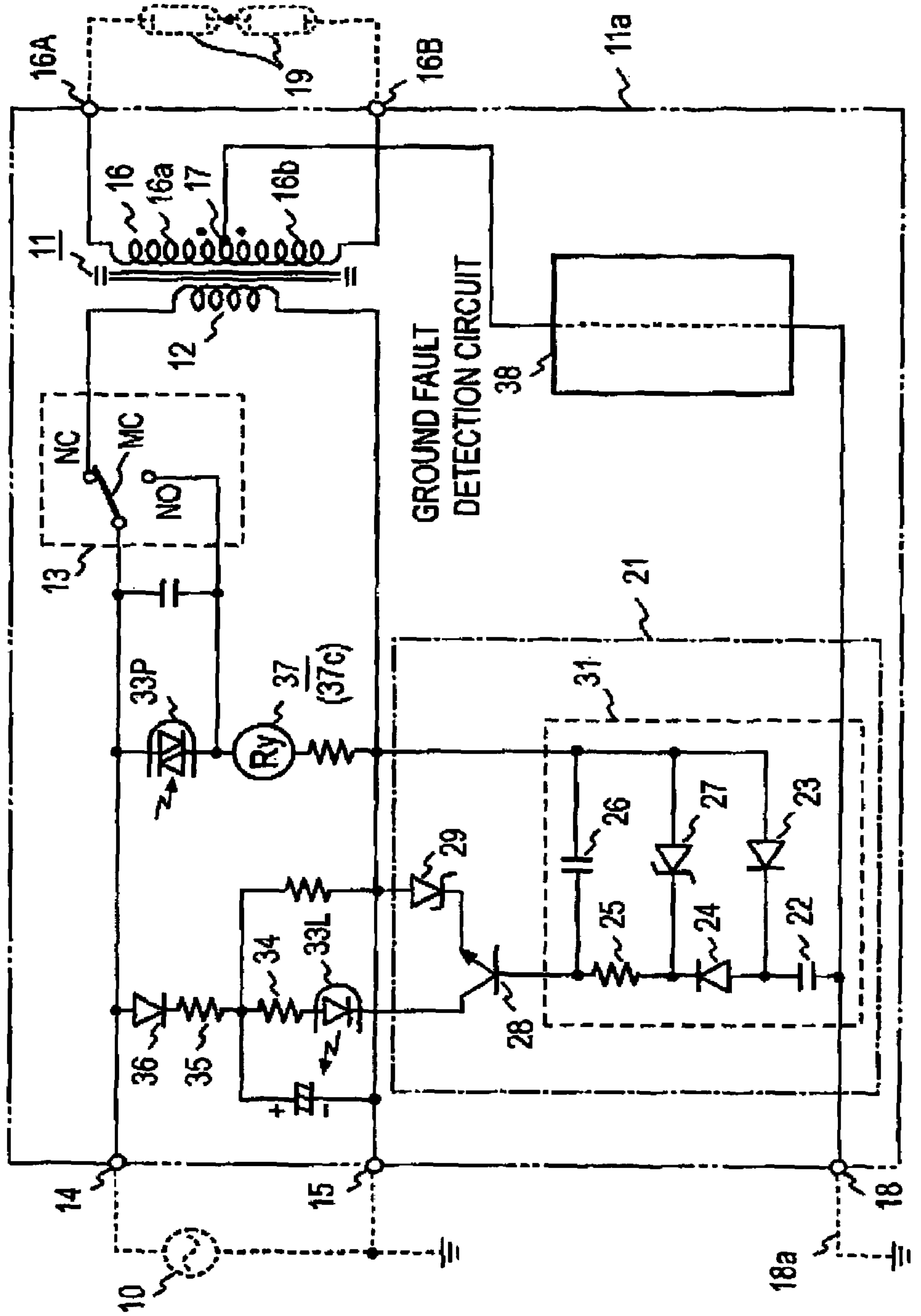
FIG. 1 PRIOR ART
FIG. 1 is a circuit diagram of a conventional transformer with a non-grounding protection circuit.
Figure 2:
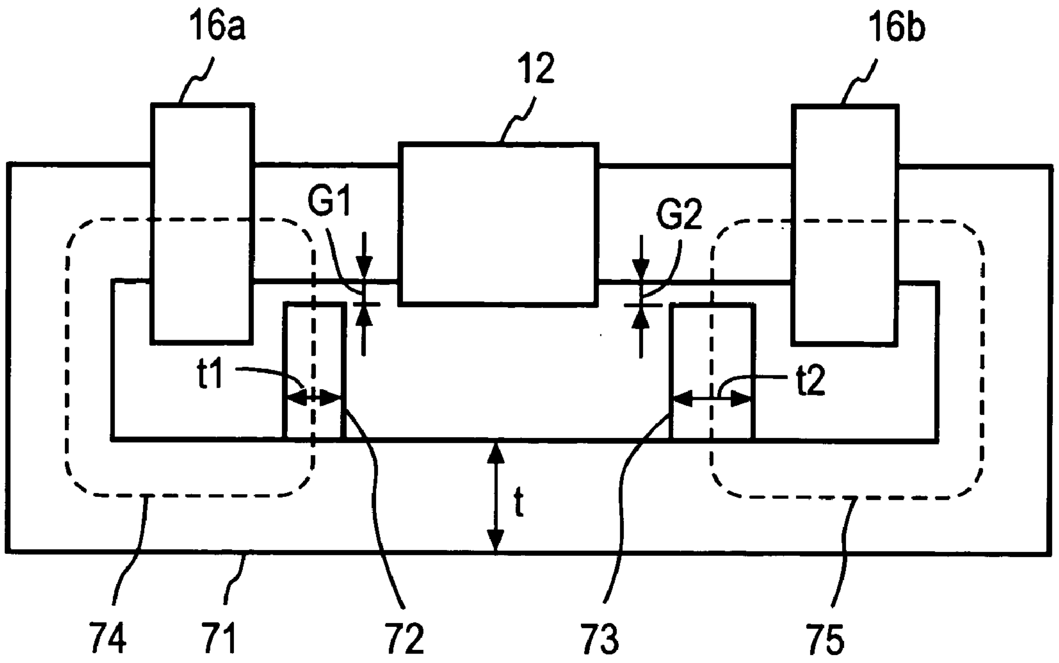
FIG. 2 PRIOR ART
FIG. 2 is a plan view showing an exemplary construction of a magnetic core of a transformer having unbalanced secondary magnetic responses.
Figure 4:
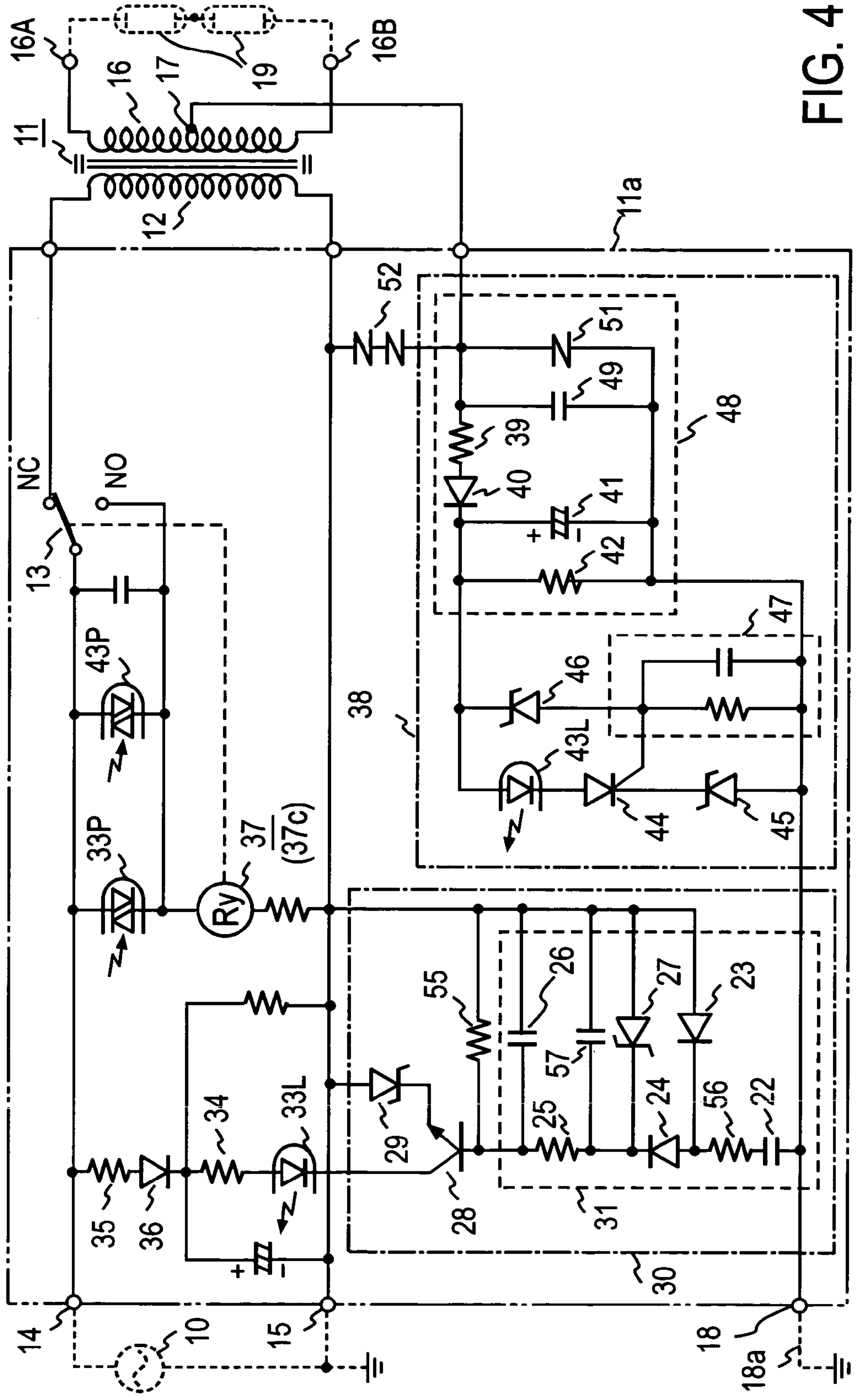
FIG. 4 is a circuit diagram of an embodiment of the present invention.

An embodiment of the present invention will be described below. A discharge tube lighting transformer of the kind described is generally provided with so-called ground fault protective means which is intended to prevent a fire accident from occurring as a result of an electrical contact of the wiring which is used to connect discharge tubes across the secondary winding with a neon tower or the like. Accordingly, an embodiment of the present invention which is applied to a transformer provided with such ground fault protective means will be described with reference to FIG. 4 where corresponding parts to those shown in FIG. 1 are designated by like reference numerals without repeating their description.

A ground fault detection circuit 38 is connected between the mid-point 17 of the secondary winding 16 of the transformer 11 and the ground terminal 18. In the ground fault detection circuit 38, the mid-point 17 is connected to the ground terminal 18 through a series circuit including a resistor element 39 and a diode 40 and through a capacitor 41. Capacitor 41 is shunted by a resistor element 42, which is shunted by a series circuit including a light emitting element 43L of a photocoupler 43, a thyristor 44 and a Zener diode 45. A Zener diode 46 is connected between the gate of the thyristor 44 and a junction between the light emitting element 43L and the resistor element 42. The gate of the thyristor 44 is connected to the ground terminal 18 through a noise malfunction preventing circuit 47 which comprises a capacitor and a resistor element. The Zener diode 45 also provides a bias to the gate of the thyristor 44 in order to prevent a malfunctioning by noises. The resistor elements 39 and 42, the diode 40 and the capacitor 41 form together a rectifying and smoothing circuit.

A photothyristor 43P which serves as a light receiving element of the photocoupler 43 is connected in parallel with a photothyristor 33P. A capacitor 49 is connected in parallel with the input of the rectifying and smoothing circuit 48. The purpose of the capacitor 49 is to prevent the ground fault detection circuit 38 from being operated in response to a voltage rise between the mid-point 17 and the ground terminal 18 which may occur as a result of a relatively large leak current through a floating capacitance when a metal conduit is used for the wiring between the secondary side of the transformer 11 and the discharge tubes 19, by passing the leak current to the ground through the capacitor 49 to reduce the impedance between the mid-point 17 and the ground (the ground terminal 18). In other words, parameters of various components are chosen so as to prevent the Zener diode 46 from becoming conductive in response to a voltage developed across the capacitor 49 by the leak current. The capacitor 49 may be replaced by a resistor element.

When the secondary winding 16 side of the transformer 11 is normal or in the absence of a ground fault, a stepped up a.c. power is developed across the opposite ends 16A and 16B of the secondary winding 16, and the potential at one end 16A varies sinusoidally between $+V_H$ and $-V_H$ while the potential at the other end 16B varies sinusoidally between $-V_H$ and $+V_H$ for each half-period of the a.c. power, and the potential at the mid-point 17 of the secondary winding 16 always remains to be substantially zero. However, when one side of the secondary winding 16, for example, the wiring connected to the end 16A comes into contact with the ground, the side which is brought into contact with the ground always assumes a potential which is close to zero potential, while the potential at the mid-point 17 varies sinusoidally substantially between $\pm V_H$, and the a.c. voltage developed between the mid-point 17 and the ground terminal 18 is rectified and smoothed by the rectifying and smoothing circuit 48. When the rectified and smoothed output voltage exceeds a given value, or when the voltage applied to the Zener diode 46 exceeds the Zener voltage which may be 12V, for example, the Zener diode 46 is rendered conductive to render the thyristor 44 conductive, whereupon light is emitted by the light emitting element 43L and is received by the photothyristor 43P which then conducts to pass a current through a relay coil 37. Thereupon, the movable contact MC of the switch 13 which is formed by a contact of the relay 37 is thrown from its normal closed contact NC to normal open contact NO, whereupon the power interrupting switch is turned off, interrupting the supply of the a.c. power to the primary winding 12, preventing a ground fault current from continuing to flow. A surge absorber 51 is connected in parallel with the capacitor 49 in order to prevent a malfunctioning of the ground fault detection circuit 38 in response to a surge voltage and preventing the ground fault detection circuit 38 from being destroyed. It will be noted that a surge absorber 52 is connected between the non-active line terminal 15 and the mid-point 17.

In this embodiment, a non-grounding protection circuit 30 is connected between the non-active line terminal 15 and the ground terminal 18. In this example, the non-grounding protection circuit 30 is connected between the mid-point 17 of the secondary winding 16 and the non-active line terminal

15 through the rectifying and smoothing circuit 48. The non-grounding protection circuit 30 is arranged in substantially similar manner as the non-grounding detection circuit 21 shown in FIG. 1, but in the non-grounding protection circuit 30, a resistor element 55 is connected between the base of the transistor 28 and the non-active line terminal 15, and an input voltage to the rectifier circuit 31 is divided by the combination of the resistor element 55 and the rectifier circuit 31 in a manner such that when a voltage at the mid-point 17 of the secondary winding relative to the non-active line terminal 55 is greater than an a.c. voltage applied between the hot line terminal 14 and the non-active line terminal 15, this voltage is detected. The resistance of the resistor element 55 is chosen so that the non-grounding protection circuit operate in this manner. An arrangement is made such that if an input a.c. voltage is equal to 120V across the hot line terminal 14 and the non-active line terminal 15, the transistor 28 is rendered conductive at a voltage between the mid-point 17 and the non-active line terminal 15 which is equal to or greater than 180V and that the transistor 28 is rendered conductive for an input a.c. voltage of 277V when a voltage between the mid-point 17 and the non-active line terminal 15 is equal to or greater than 350V. It is to be noted that the rectifier circuit 31 contains a resistor element 56 and a capacitor 57 which are not shown in FIG. 1, but which are provided to eliminate noises.

Figure 3:
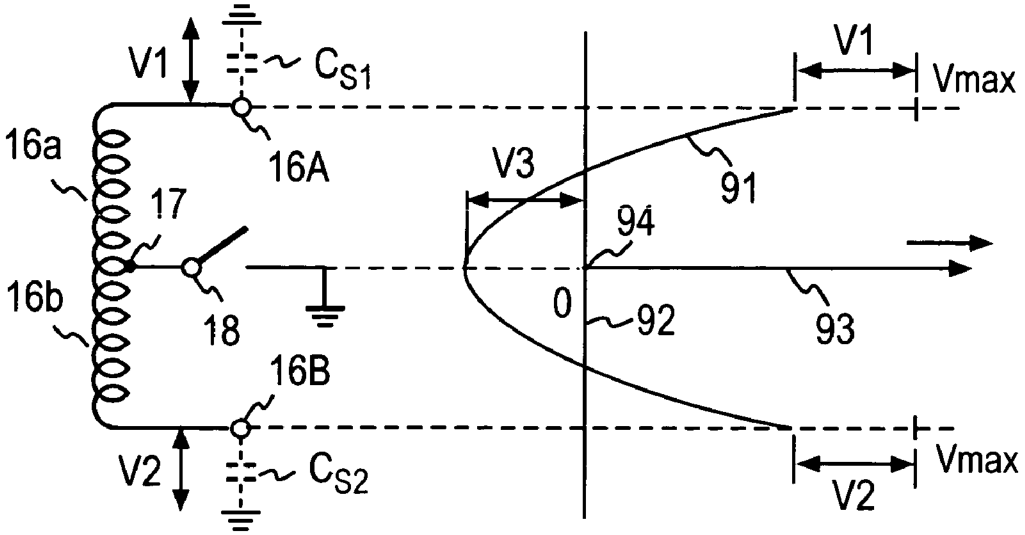
FIG. 3 PRIOR ART
FIG. 3 is a circuit diagram illustrating a rise of the mid-point voltage which is caused by the presence of the metal conduit.

In order to allow such a circuit operation, an arrangement is made so that a voltage equal to or in excess of about 1.5 times the input a.c. voltage, which may be 180V or 350V or higher in the numerical example given above appears between the mid-point 17 of the secondary winding 16 and the non-active line terminal 15 as a result of the inbalance of the transformer 11 when the ground terminal 18 is not grounded. By way of example, a choice is made that $V_{UE}$=500V so that the circuit may operate for either voltage of 120V or 277V of the input a.c. power. In the specific example of inbalance means shown in FIG. 3, if 15 kV is generated across the opposite ends 16A and 16B of the secondary winding 16, the width $t_1$ of the leakage core 72 is by an amount on the order of 10 to 30% smaller than the width t of the frame-shaped magnetic core 71 while the width the $t_2$ of the leakage core 73 is by an amount on the order of 10 to 30% greater than the width t, whereby a voltage from 150V to 500V is developed at the mid-point 17 for the transformer having the secondary output voltage of 15 kV and the secondary short-circuit current of 30 mA with the mid-point of the load grounded. The voltage $V_{UH}$ from 30V to 100V will be developed at the mid-point 17 when the mid-point of the load is not grounded while maintaining other conditions unchanged. When a metal conduit is not used, the non-grounding protection circuit 30 is arranged not to operate if both the ground terminal 18 and the mid-point of the load are not grounded. From this point of view, $V_{UH}$ is chosen to be 100V, for example. Alternatively, the number of turns of the windings 16*a* and 16*b* located on the opposite sides of the mid-point 17 of the secondary winding 16 may be different so that $V_{UE}$=500V is obtained at the mid-point 17 when the mid-point of the load is grounded and $V_{UH}$=100V is obtained at the mid-point 17 when the mid-point of the load is not grounded.

The voltage $V_{UE}$ which is developed between the mid-point 17 and the non-active line terminal 15 due to non-grounding of the ground terminal 18 is chosen so as not to operate the ground fault detection circuit 38. When the ground terminal 18 is not grounded, the ground fault detection circuit 38 and the non-grounding protection circuit 30 are connected in series between the mid-point 17 and the non-active line terminal 15, and a voltage $V_{UE}$ which is developed across the mid-point 17 and the non-active line terminal 15 is divided by the both circuits 38 and 30 to be applied to each circuit. The ground fault detection circuit 38 does not operate in response to the divided voltage when it is applied. Specifically, circuit parameters are determined so that the voltage applied to the Zener diode 46 cannot exceed 12V to render it conductive. At this time, the non-grounding protection circuit 30 detects a ground fault in response to the divided voltage when the ground terminal 18 is not grounded and when the voltage $V_{UE}$ across the mid-point 17 and the non-active line terminal 15 exceeds a value on the order of 1.5 times the input a.c. voltage in the above example as when a ground fault occurs.

Specifically, denoting the voltage of the input a.c. power across the terminals 14 and 15 by $V_I$, a voltage developed at the mid-point 17 as a result of a ground fault of one side of the secondary winding 16 of the transformer 11 by $V_{US}$, a voltage developed at the mid-point 17 as a result of non-grounding of the ground terminal 18 when the mid-point of the load is grounded by $V_{UE}$, a voltage developed at the mid-point 17 as a result of the non-grounding of the ground terminal 18 when the mid-point of the load is not grounded by $V_{UH}$, an impedance of the non-grounding protection circuit 30 by $Z_{NE}$ and an impedance of the ground fault detection circuit 38 by $Z_{SE}$, it then follows that a voltage applied to the input to the non-grounding protection circuit 30 as a result of non-grounding of the ground terminal 18 is given by $V_{NEE}=(Z_{NE}/(Z_{SE}+Z_{NE}))V_{UE}$ when the mid-point of the load is grounded, and by $V_{NEH}=Z_{NE}/(Z_{SE}+Z_{NE}))V_{UH}$ when the mid-point of the load is not grounded. A threshold voltage $V_{TNE}$ above which the non-grounding protection circuit 30 can detect a non-grounding satisfies the inequality $V_{NEE}>V_{TNE}>(V_I, V_{NEH})$. A voltage applied to the input of the ground fault detection circuit 38 as a result of the non-grounding of the ground terminal 18 when the mid-point of the load is grounded is given by $V_{SE}=(Z_{SE}/(Z_{SE}+Z_{NE}))V_{UE}$ and a threshold voltage $V_{TSE}$ above which the ground fault detection circuit 38 can detect a ground fault satisfies the inequality $V_{US}>V_{TSE}>V_{SE}$. It should be noted that $V_{UE}>V_{UH}$. A voltage applied to the ground fault detection circuit 38 as a result of a ground fault occurring on one side of the secondary winding 16 while the ground terminal 18 is not grounded is given by $V_{SES}=(Z_{SE}/(Z_{SE}+Z_{NE}))V_{US}$, and a voltage applied to the non-grounding protection circuit 30 under the same conditions is given by $V_{NES}=(Z_{NE}/(Z_{SE}+Z_{NE}))V_{US}$, and these voltages satisfy the inequalities $V_{SES}<V_{TSE}$ and $V_{NES}>V_{TNE}$. Unbalanced voltages $V_{UE}$and $V_{UH}$ which occur at the mid-point 17 and the impedances $Z_{SE}$ and $Z_{NE}$ are chosen to satisfy above relationships. It is a general practice that grounding the mid-point of the load is forbidden. In the arrangement shown in FIG. 4, when the mid-point of the load is grounded and the ground terminal 18 is not grounded, the non-grounding protection circuit 30 operates in response to the voltage $V_{UE}$occurring at the mid-point 17 to interrupt the supply of the a.c. power to the secondary side.

If the terminals 14 and 15 are connected to the a.c. power source 10 in reverse polarities when the ground terminal 18 is grounded, the non-active line terminal 15 assumes a negative potential relative to the ground terminal 18, and accordingly, an input a.c. voltage is applied to the non-grounding protection circuit 30, but this voltage is insufficient to render the transistor 28 conductive. In other words, a connection in the inverse polarities cannot result in a false detection as the non-grounding of the ground terminal.

If the ground terminal 18 is not grounded before the leakage transformer 11 is installed on site, for example, during the inspection performed at the factory, the voltage developed at the mid-point 17 may rise to an order of 100V (for a secondary output voltage of 15 kV), but because this is equal to or less than the input of a.c. voltage, the non-grounding protection circuit 30 does not operate. In other words, such inspection can be completed in a simple manner without grounding the ground terminal 18 and without requiring the polarities of connection to the a.c. power source to be concerned.

When the mid-point of the load is not grounded and the ground terminal 18 is not grounded, the a.c. power is supplied to the secondary side, allowing the discharge tubes to be illuminated. If a ground fault occurs on the secondary side under this condition, the non-grounding protection circuit 30 operates to interrupt the supply of the a.c. power. When the mid-point of the load is grounded, the non-grounding of the ground terminal 18 can be detected. The surge absorber 52 is chosen to operate at 2200V for the input voltage $V_I$ of 120V, and to operate at 2900V for a value of $V_I$ of 277V. When the mid-point of the load is grounded, in the event of occurrence of a ground fault while the ground terminal 18 is not grounded and until the non-grounding protection circuit 30 operates to operate the relay 37, the surge absorber 52 operates, thus protecting the capacitors 22 and the light emitting element 43L from being damaged.

What is claimed is:

1. A discharge tube lighting transformer apparatus with a protection circuit against non-grounding of a ground terminal comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding while the ground terminal is grounded as normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting if a voltage appearing between the non-active line terminal and the ground terminal is larger than A.C. voltage of the A.C. power source applied across the non-active line terminal and the hot line terminal, to thereby generate a detection output; and power source interrupting means controlled operatively by one of the detection outputs from the non-grounding protection circuit and the ground fault detection circuit to operatively interrupt the supply of the A.C. power from the hot line terminal and the non-active line terminal to the primary winding.

2. A discharge tube lighting transformer apparatus with a protection circuit against non-grounding of a ground terminal comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding while the ground terminal is grounded as normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting if a voltage appearing between the non-active line terminal and the ground terminal is larger than an A.C. voltage of the A.C. power source applied across the non-active line terminal and the hot line terminal, to thereby generate a detection output; and power source interrupting means controlled operatively by one of the detection outputs from the non-grounding protection circuit and the ground fault detection circuit to operatively interrupt the supply of the A.C. power from the hot line terminal and the non-active line terminal to the primary winding, wherein the non-grounding protection circuit comprises a rectifier circuit having an input end which is formed by one end of a capacitor connected to the ground terminal of the transformer, a resistor element connected between an output terminal of the rectifier circuit and the non-active line terminal, and a switching element having its input connected across the resistor element and adapted to be rendered conductive by an input voltage which is equal to or larger than a threshold voltage given by threshold means to control the power source interrupting means operative by its conduction.

3. The discharge tube lighting transformer apparatus according to claim 2 in which a threshold voltage $V_{TSE}$ for the detection by the ground fault detection circuit is greater than the threshold voltage $V_{TNE}$ for the detection by the non-grounding protection circuit, said threshold voltage $V_{TSE}$ is larger than a voltage which is applied to the ground fault detection circuit as a result of a voltage developed at the mid-point when the ground fault occurs in the connection wiring across the secondary winding while the ground terminal is not grounded as abnormal state, and said threshold voltage $V_{TNE}$ is less than a voltage which is applied to the non-grounding protection circuit.

4. A discharge tube lighting transformer apparatus comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding occurs while the ground terminal is grounded as normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting if a non-grounding fault of the ground terminal occurs, to thereby generate a detection output; and power source interrupting means controlled by one of the detection outputs from the non-grounding protection circuit and the ground fault detection circuit to interrupt the supply of the A.C. power from the hot line terminal and the non-active line terminal to the primary winding, wherein the non-grounding protection circuit comprises a rectifier circuit having an input end which is formed by one end of a capacitor connected to the ground terminal of the transformer, a resistor element connected between an output terminal of the rectifier circuit and the non-active line terminal, a switching element having its input connected across the resistor element and adapted to be rendered conductive by an input voltage generated across the resister element which is equal to or larger than a threshold voltage determined by threshold means, and output means for generating a detection signal in response to conduction of the switching element, wherein when the ground terminal is not grounded as abnormal state, and the ground fault occurs in the connection wiring, the ground fault detection circuit and the non-grounding protection circuit are connected in series between the mid-point of the secondary winding and the non-active line terminal, the transformer generates at the mid-point of the secondary winding a voltage $V_{US}$, which is divided into two partial voltages $V_{SES}$ and $V_{NES}$ corresponding to the respective impedances of the ground fault detection circuit and the non-grounding protection circuit, respectively, one of the two partial voltages $V_{SES}$ obtained and applied to the ground fault detection circuit is determined to render the ground fault detection circuit inoperative, the other partial voltage VNES obtained and applied to the non-grounding protection circuit is rectified by the rectifier circuit and divided into two partial rectified voltages corresponding to the respective impedances of the rectifier circuit and the resister element, respectively, and the input voltage of the switching element generated across the resister element is determined to be larger than the threshold voltage, whereby the switching element of the non-grounding protection circuit is rendered conductive when the ground fault occurs in the connection wiring.

5. A discharge tube lighting transformer apparatus comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding while the ground terminal is grounded as normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting if occurs a non-grounding fault of the ground terminal, to thereby generate a detection output; and power source interrupting means controlled by one of the detection outputs from the non-grounding protection circuit and the ground fault detection circuit to interrupt the supply of the A.C. power from the hot line terminal and the non-active line terminal to the primary winding, wherein the non-grounding protection circuit comprises a rectifier circuit having an input end which is formed by one end of a capacitor connected to the ground terminal of the transformer, a resistor element connected between an output terminal of the rectifier circuit and the non-active line terminal, a switching element having its input connected across the resistor element and adapted to be rendered conductive by an input voltage generated across the resister element which is equal to or larger than a threshold voltage determined by threshold means, and output means for generating a detection signal in response to conduction of the switching element, wherein when the ground terminal is not grounded as an abnormal state, and no ground fault occurs in the connection wiring, the ground fault detection circuit and the non-grounding protection circuit are connected in series between the mid-point of the secondary winding and the non-active line terminal, the transformer generates at the mid-point of the secondary winding a voltage $V_{UH}$ which is determined not to be larger than an A.C. voltage when a mid point between discharge tubes connected across the secondary winding is not grounded as a normal state, so that the voltage $V_{UH}$ is divided into two partial voltages corresponding to the respective impedances of the ground fault detection circuit and the non-grounding protection circuit, respectively, one of the two partial voltages $V_{NEH}$ obtained from the voltage $V_{UH}$ and applied to the non-grounding protection circuit is rectified by the rectifier circuit and divided into two partial rectified voltages corresponding to the respective impedances of the rectifier circuit and the resister element, respectively, and the input voltage of the switching element generated across the resister element is determined to be less than the threshold voltage, whereby the switching element is not rendered conductive.

6. A discharge tube lighting transformer apparatus comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding while the ground terminal is grounded as a normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting, if one occurs, a non-grounding fault of the ground terminal, to thereby generate a detection output; and power source interrupting means controlled by one of the detection outputs from the non-grounding protection circuit and the ground fault detection circuit to interrupt the supply of the A.C. power from the hot line terminal and the non-active line terminal to the primary winding, wherein the non-grounding protection circuit comprises a rectifier circuit having an input end which is formed by one end of a capacitor connected to the ground terminal of the transformer, a resistor element connected between an output terminal of the rectifier circuit and the non-active line terminal, a switching element having its input connected across the resistor element and adapted to be rendered conductive by an input voltage generated across the resister element which is equal to or larger than a threshold voltage determined by threshold means, and output means for generating a detection signal in response to conduction of the switching element, wherein when the ground terminal is not grounded as an abnormal state, and no ground fault occurs in the connection wiring, the ground fault detection circuit and the non-grounding protection circuit are connected in series between the mid-point of the secondary winding and the non-active line terminal, the transformer generates at the mid-point of the secondary winding a voltage $V_{UE}$ which is determined to be larger than an A.C. voltage, when the mid point of the discharge tubes is grounded as an abnormal state, so that the voltage $V_{UE}$ is divided into two partial voltages corresponding to the respective impedances of the ground fault detection circuit and the non-grounding protection circuit, respectively, one of the two partial voltages $V_{NEE}$ obtained from the voltage $V_{UE}$ and applied to the non-grounding protection circuit is rectified by the rectifier circuit and divided into two partial rectified voltages corresponding to the respective impedances of the rectifier circuit and the resister element, respectively, and the input voltage of the switching element generated across the resister element is determined to be larger than the threshold voltage, whereby the switching element is rendered conductive.

7. A discharge tube lighting transformer apparatus comprising:

a transformer having a primary winding, a secondary winding with a mid-point and unbalancing means for causing voltages induced across windings disposed on the opposite sides of the mid-point of the secondary winding to be unbalanced relative to each other;

a ground fault detection circuit connected between the mid-point of the secondary winding and a ground terminal of the transformer for detecting, if one occurs, a ground fault in a connection wiring which connects discharge tubes across the secondary winding while the ground terminal is grounded as normal state, to thereby generate a detection output;

a hot line terminal and a non-active line terminal to be connected to a non-grounded side and a ground side of A.C. power source, respectively;

a non-grounding protection circuit connected between the non-active line terminal and the ground terminal for detecting a non-grounding fault of the ground terminal, to thereby generate a detection output; and power source interrupting means controlled by one of the detection outputs from the non-grounding protection circuit and the ground fault detection circuit to interrupt the supply of the A.C. power from the hot line terminal and the non-active line terminal to the primary winding, wherein the non-grounding protection circuit comprises a rectifier circuit having an input end which is formed by one end of a capacitor connected to the ground terminal of the transformer, a resistor element connected between an output terminal of the rectifier circuit and the non-active line terminal, a switching element having its input connected across the resistor element and adapted to be rendered conductive by an input voltage generated across the resister element which is equal to or larger than a threshold voltage determined by threshold means, and output means for generating a detection signal in response to conduction of the switching element, wherein when the hot line terminal and the non-active line terminal are connected to the A.C. power source in reverse polarities while the ground terminal is grounded as normal state, the A.C. voltage applied between the non-active line terminal and the ground terminal is rectified by the rectifier circuit of the non-grounding protection circuit and divided into two partial rectified voltages corresponding to the respective impedances of the rectifier circuit and the resister element, respectively, and the input voltage of the switching element generated across the resister element is determined to be less than the threshold voltage, whereby the switching element of the non-grounding protection circuit is not rendered conductive.

* * * * *

UNITED STATES PATENT AND TRADEMARK OFFICE

CERTIFICATE OF CORRECTION

PATENT NO. : 7,199,988 B2
APPLICATION NO. : 10/871035
DATED : April 3, 2007
INVENTOR(S) : Hitoshi Komori et al.

It is certified that error appears in the above-identified patent and that said Letters Patent is hereby corrected as shown below:

On the Title page at item [75] Inventors:

"Kazuhifo" should read --Kazuhiro--.

Signed and Sealed this

Seventh Day of August, 2007

JON W. DUDAS
*Director of the United States Patent and Trademark Office*